US005586250A

United States Patent [19]
Carbonneau et al.

[11] Patent Number: 5,586,250
[45] Date of Patent: Dec. 17, 1996

[54] SCSI-COUPLED MODULE FOR MONITORING AND CONTROLLING SCSI-COUPLED RAID BANK AND BANK ENVIRONMENT

[75] Inventors: Guy A. Carbonneau, Winter Springs; Bernie Wu, Longwood; Tim Jones, Deltona, all of Fla.

[73] Assignee: Conner Peripherals, Inc., San Jose, Calif.

[21] Appl. No.: 151,525

[22] Filed: Nov. 12, 1993

[51] Int. Cl.⁶ .................................................. G06F 11/00
[52] U.S. Cl. .............................. 395/183.2; 395/185.01; 395/182.04
[58] Field of Search ..................... 395/575, 182.03, 395/182.12, 182.04, 183.17, 183.2, 182.05, 185.01

[56] References Cited

U.S. PATENT DOCUMENTS

| | | | |
|---|---|---|---|
| 3,704,363 | 11/1972 | Salmassy et al. | 235/153 |
| 5,148,432 | 9/1992 | Gordon et al. | 371/10.1 |
| 5,313,585 | 5/1994 | Jefferies et al. | 395/275 |
| 5,313,626 | 5/1994 | Jones et al. | 395/575 |
| 5,337,414 | 8/1994 | Hashemi et al. | 395/275 |
| 5,367,669 | 11/1994 | Holland et al. | 395/575 |

FOREIGN PATENT DOCUMENTS

| | | | |
|---|---|---|---|
| 0352340A1 | 7/1988 | European Pat. Off. | G06F 11/30 |
| 0352340 | 1/1990 | European Pat. Off. | G06F 11/30 |
| 0547844A2 | 10/1992 | European Pat. Off. | G06F 3/06 |
| 0516993 | 12/1992 | European Pat. Off. | G06F 3/06 |
| 0554982 | 8/1993 | European Pat. Off. | G06F 11/30 |
| WO93/22729 | 4/1993 | WIPO | G06F 13/40 |

OTHER PUBLICATIONS

Brown, Tangent MultiServer M433Ms, Computer Shopper, Jul. 1992, at 204.

LAN Times 1992–1993 Buyer's Directory: Storage, LAN Times, Jul. 1992, at 311.

Disk Space Monitoring, IBM Technical Disclosure Bulletin, vol 34, No. 2, Jul. 1991, at 240–243.

Differential–Single–Ended SCSI Interface Description, IBM Technical Disclosure Bulletin, vol. 33, No. 11, Apr. 1991, at 331–335.

How Reliable is a Raid?, M. Schulze et al., COMPCON'89 Digest of Papers, Mar. 27, 1989, San Francisco, at 118–123.

NCR Corporation, "NCR ADP–93–XX Disk Array Controller", Software Manual Release 1.XX, at 10–23 to 10–27, 1993.

*Primary Examiner*—Robert W. Beausoliel, Jr.
*Assistant Examiner*—Alan M. Fisch
*Attorney, Agent, or Firm*—Fliesler, Dubb, Meyer & Lovejoy

[57] ABSTRACT

An intelligent status monitoring, reporting and control module is coupled to a SCSI bus that interconnects a cluster of SCSI-compatible data storage modules (e.g., magnetic disk drives). The status monitoring, reporting and control module is otherwise coupled to the cluster of SCSI-compatible data storage modules and to power maintenance and/or other maintenance subsystems of the cluster for monitoring and controlling states of the data storage modules and power maintenance and/or other maintenance subsystems that are not readily monitored or controlled directly by way of the SCSI bus. The status monitoring, reporting and control module sends status reports to a local or remote system supervisor and executes control commands supplied by the local or remote system supervisor. The status reports include reports about system temperature and power conditions. The executable commands include commands for regulating system temperature and power conditions.

41 Claims, 5 Drawing Sheets

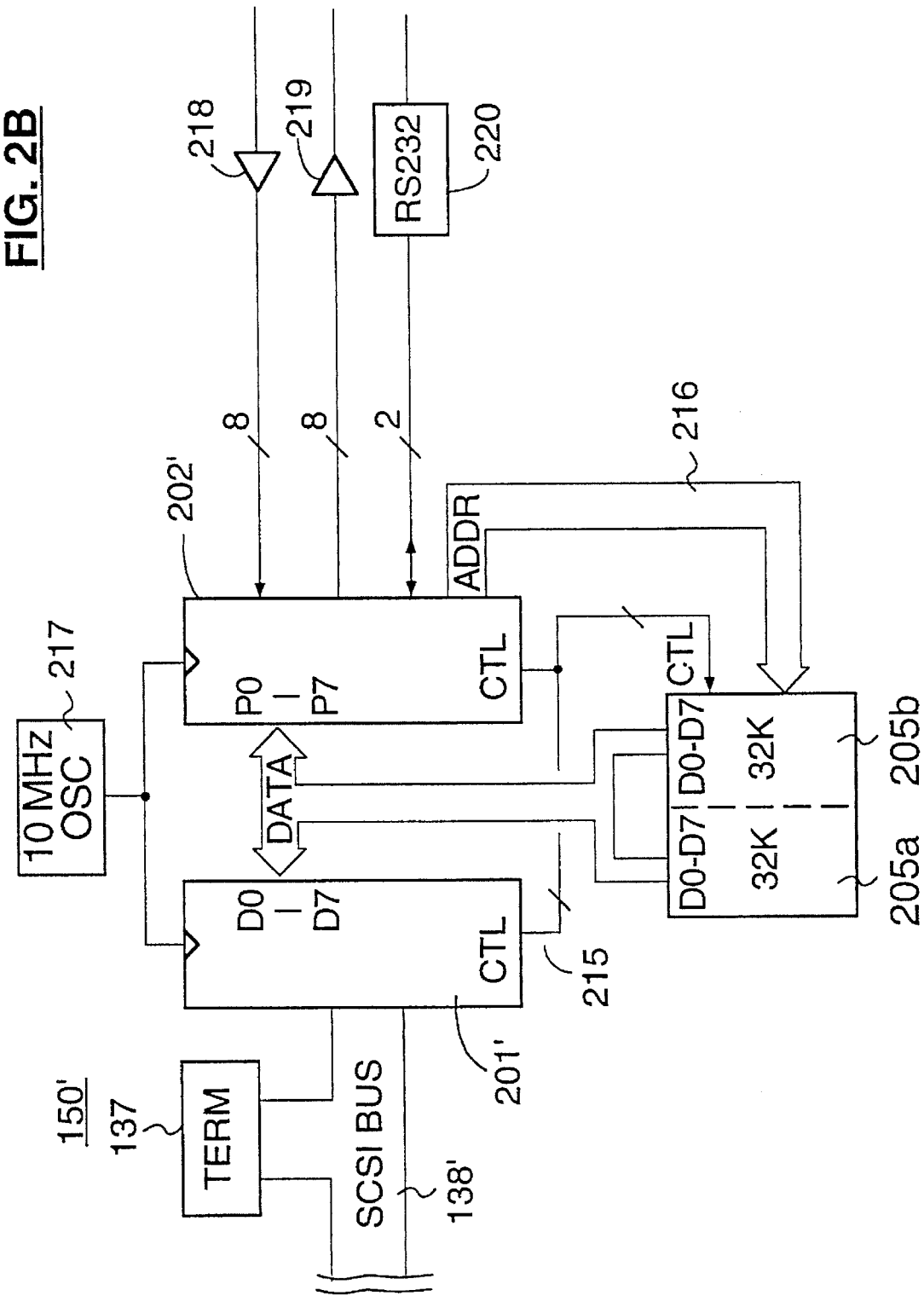

SCSI-COUPLED MODULE FOR MONITORING AND CONTROLLING SCSI-COUPLED RAID BANK AND BANK ENVIRONMENT

BACKGROUND

1. Field of the Invention

The invention relates generally to redundant arrays of data storage devices. The invention relates more specifically to a RAID system that connects to a host computer by way of a SCSI interface and a diagnostics/control module that also connects to the SCSI interface.

2a. Cross Reference to Related Applications

The following copending U.S. patent application is assigned to the assignee of the present application, is related to the present application and its disclosure is incorporated herein by reference:

(A) Ser. No. 08/124,276 filed Sep. 20, 1993 by Larry Kibler et al and entitled, FULL-HEIGHT DISK DRIVE SUPPORT STRUCTURE.

2c. Cross Reference to Related Patents

The following U.S. patent is related to the present application and its disclosure is incorporated herein by reference:

(A) U.S. Pat. No. 5,148,432 issued to Gordon et al. and entitled ARRAYED DISK DRIVE SYSTEM AND METHOD.

3. Description of the Related Art

The use of RAID data storage systems (Redundant Array of Inexpensive Disk-drives) is becoming increasingly popular due to economic and technical reasons.

Data storage strategies are being shifted away from having one large mainframe computer coupled to an array of a few, large disk units or a few, bulk tape units, and are instead being shifted in favor of having many desktop or mini- or micro-computers intercoupled by a network to one another and to many small, inexpensive and modularly interchangeable data storage devices (e.g., to an array of small, inexpensive, magnetic storage disk drives). One of the reasons behind this trend is a desire in the industry to maintain at least partial system functionality even in the event of a failure in a particular system component. If one of the numerous mini/micro-computers fails, the others can continue to function. If one of the numerous data storage devices fails, the others can continue to provide data access. Also increases in data storage capacity can be economically provided in small increments as the need for increased capacity develops.

A common configuration includes a so-called "client/server computer" sandwiched between a local area network (LAN) and a RAID data storage system. Remote users (clients) send requests for read and/or write access to data files contained in the RAID system over the network (LAN). The client/server computer services each request on a time shared basis.

As the client/server computer performs its client servicing tasks, the client/server computer is burdened at the same time with the overhead of attending to mundane tasks such as monitoring the operational status of each disk drive in the RAID system and taking corrective action, or at least issuing an alarm, when a problem develops.

A difficulty develops when the request-servicing bandwidth and/or storage capacity of such a RAID-based client/server system needs to be scaled upwardly. If the number of network users (clients) or request-load per user increases, the request-servicing burden that is placed on the client/server computer tends to increase correspondingly. At some point, the client/server computer bumps against the limits of its data processing speed and system responsiveness suffers.

System responsiveness is disadvantageously degraded by the burden that status monitoring overhead places on the client/server computer. In other words, the status monitoring overhead disadvantageously reduces the ability of the client/server computer to more quickly respond to the ever-growing number of service requests that it receives from the network. In addition, the status-monitoring overhead burden disadvantageously grows as more data storage drives are added to the RAID system. And accordingly, even though the addition of more data storage drives beneficially increases the system's storage capacity, it also tends to degrade system response speed.

The status monitoring function of the client/server computer is typically supported by customized hardware that is added to an expandable bus of the client/server computer. In one configuration, a serial and/or parallel I/O board is inserted into one of the expansion slots of the client/server computer and site-customized cables are routed from this I/O board to status sensors that are mounted on or in various components of the disk array. Monitoring software is loaded into the client/server computer to drive the I/O board, to query the various sensors and to receive status reports back from them. Such an arrangement is disadvantageous in that an expansion slot of the client/server computer is consumed for carrying out the disk-array monitoring function. It is also disadvantageous because of the customized nature of the sensor cables extending from the I/O board. Each RAID server tends to have its own unique configuration. A network having many such uniquely-configured servers is difficult to maintain.

Increasingly, there is a need within the industry for arranging the client/server computer as an off-the-shelf commodity item that can be quickly and inexpensively replaced in case of failure. There is a long felt desire in the industry to avoid customized routings of cables between a stand-alone computer and peripheral sensors. There is a need in the industry for disk drive arrays or other data storage arrays that can be quickly and efficiently serviced in the event of a failure. There is a growing desire in the industry to be able to control all operations of a networked RAID system from a remote control console without adversely affecting normal operations of the network.

SUMMARY OF THE INVENTION

The invention helps to attain the above-mentioned objectives by providing a SCSI-coupled module for monitoring and for controlling a SCSI-coupled cluster of devices such as a SCSI-coupled RAID bank.

A structure in accordance with the invention comprises: a cluster of SCSI modules coupled to one another by a SCSI bus, wherein at least one of the SCSI modules has no means for directly reporting to the SCSI bus, the status of power delivered to internal circuitry of the at least one SCSI module or the status of other conditions (e.g., temperature, open door) affecting the operability or security of the at least one SCSI module and wherein a second of the SCSI modules includes status monitoring, reporting and control means for monitoring and directly reporting to the SCSI bus, the status of power delivered to internal circuitry of the at least one SCSI module or the status of other conditions (e.g., temperature) affecting the operability and/or security of the at least one SCSI module. The status monitoring, reporting and control means is optionally provided with control functions so that it can actively control the power delivered to internal circuitry of the at least one SCSI module or the status of other conditions (e.g., temperature, door lockings) affecting the operability and/or security of the at least one SCSI module either in response to commands received over the SCSI bus or on its own initiative.

A method in accordance with the invention comprises the steps of: (a) attaching a status monitoring, reporting and control means to a SCSI bus having a cluster of SCSI modules; (b) operatively coupling the status monitoring, reporting and control means to a power maintenance and/or other environment maintenance subsystems of the cluster; and (c) operating the status monitoring, reporting and control means so that the status monitoring, reporting and control means provides one or more of the following functions: (c.1) providing on-site reports via an on-site indicator means of cluster status and cluster problems to an on-site observer (e.g., by creating appropriate indication patterns on a frontpanel messaging module); (c.2) providing off-site reports via the SCSI bus of cluster status and cluster problems to a remote system supervisor; (c.3) testing the data path integrity of the SCSI bus; (c.4) conveying error history, repair history, usage history and other information about a portable cluster of SCSI modules to which the status monitoring, reporting and control means is attached; (c.5) supporting inventory/asset management functions in a large network containing the SCSI cluster; (c.6) monitoring traffic patterns of SCSI communications to or from members of the cluster; (c.7) switching a configuration of the cluster in response to a sensed degradation event within the cluster; (c.8) monitoring and managing background environmental aspects of cluster operation such as maintaining appropriate temperatures within the cluster, maintaining predefined power levels within the cluster, and assuring system security.

These and other aspects of the invention will be described in more detail below.

BRIEF DESCRIPTION OF THE DRAWINGS

The below detailed description makes reference to the accompanying drawings, in which:

FIGS. 2A–2B show schematics of cabinet monitor and control (CMAC) boards in accordance with the invention;

DETAILED DESCRIPTION

Figure 1A:
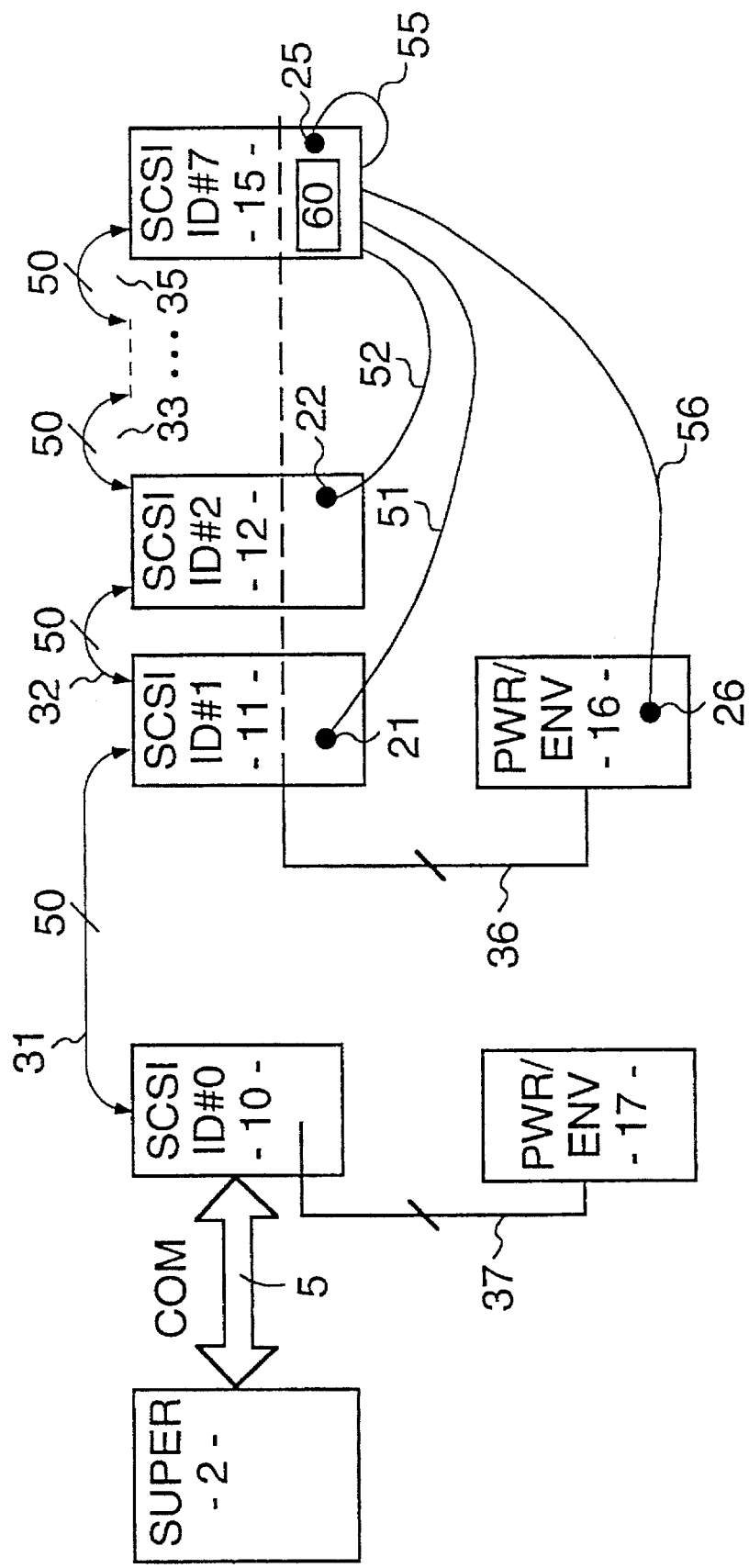
FIG. 1A is a generalized block diagram of a non-SCSI to SCSI status transfer system in accordance with the invention.

Referring to FIG. 1A, there is first shown a generalized block diagram of a non-SCSI to SCSI status transfer system in accordance with the invention. Modules 10, 11, 12, . . . , 15 each include a Small Computer System Interface (SCSI) for enabling SCSI-based data exchange between these modules 10, 11, 12, . . . , 15 in accordance with well known industry standards. Although only four such SCSI modules are shown, it is to be understood that the SCSI data exchange network (or SCSI "channel") can have as many as eight such modules and that each module has a unique SCSI identification number (ID#0 through ID#7). Each module can have within it, as many as 8 uniquely-addressable, SCSI logical units. Thus the SCSI channel can support as many as 64 uniquely-addressable, SCSI logical units.

In the illustrated example, module 10 is assigned SCSI ID#0, module 11 is assigned SCSI ID#1, module 12 is assigned SCSI ID#2, and module 15 is assigned SCSI ID#7. Four additional SCSI modules (not shown) can be inserted between modules 12 and 15 and assigned respective SCSI ID's #3 to #6.

SCSI cables 31–35 interconnect corresponding SCSI modules 10–15 in daisy chain fashion according to well known industry practice. Modules 11–15 are spaced relatively close to one another (they are "clustered") while module 10 is located relatively far (roughly 1 to 25 feet away) from the other modules 11–15. Because of this physical separation, a first power/environment support unit 16 is used to supply electrical power and provide other operational necessities (e.g., cooling) to the cluster of modules 11–15 while a second power/environmental support unit 17 is used to supply electrical power and provide other operational necessities (e.g., cooling) to the out-of-cluster module 10. An electrical/mechanical connection means 36 operatively couples the first power/environmental support unit 16 to the clustered SCSI modules 11–15 while a separate, second electrical/mechanical connection means 37 operatively couples the second power/environmental support unit 17 to separated SCSI module 10.

Module 10 is connected to a system supervisor 2 by means of a communication network 5. Communication between the system supervisor 2 and the remaining cluster of modules 11–15 is substantially limited to that which can be carried over the SCSI network (cables 31–35) to the first module 10, and from there over the communication network 5 to the system supervisor 2.

SCSI modules 11 and 12 do not include means for reporting:, by way of the SCSI network, (1) the status of power delivered to their internal circuitry (e.g., is it at nominal voltage and current, and if not what is the amount of deviation?) or (2) the status of other environmental conditions affecting their operability, such as temperature build-up, or (3) the status of yet other environmental conditions affecting their security, such as their physical removability or actual removal from the cluster.

With regard to the mentioned report items, SCSI communications do not on their own provide definitive answers. If a SCSI module is not responding to SCSI commands, such nonresponsiveness does not specifically indicate whether the cause is due to failure of the SCSI interface, or loss of power, or overheating, or physical removal or disconnect Of the module, or some other reason. Because there is no status reporting means in modules 11 and 12, and SCSI communications do not provide definitive answers, the system supervisor 2 has no way of learning about power or environmental problems simply from communications carried out with SCSI modules 11 and 12 over SCSI bus 31–35.

To overcome this problem, a Status Monitoring And Reporting means 60 (SMARt means 60) is provided within SCSI module 15 for monitoring the status of the first power/environment support unit 16 and the status of nearby modules 11–12, and even its own status, and for reporting the status of these monitored devices to the system supervisor 2 by way of the SCSI network 31–35. Sensors 21, 22, . . . , 25, 26 are attached to respective units 11, 12, . . . , 15 and 16 for monitoring temperature, electrical power levels and other aspects of cluster 11–15 that affect the operatability and/or security of SCSI cluster 11–15. Local sensor lines 51, 52, . . . , 55, 56 respectively connect sensors 21, 22, . . . , 25, 26 to the status monitoring and reporting means 60.

An appropriate intelligence means (e.g., a microcontroller or microcomputer, not shown) is provided within the status monitoring and reporting means (SMARt) 60 for causing it to periodically monitor the status of temperature, electrical power levels and other aspects affecting the operatability and security of SCSI cluster 11–15 and to report worrisome developments to the system supervisor 2 by way of the SCSI network 31–35.

Note that the status monitoring and reporting (SMARt) means 60 is preferably located in the SCSI module 15 that is most distal along the SCSI chain of cables 31–35 from the communication network 5 and the system supervisor 2. The intelligence means (e.g., a microcontroller or microcomputer) within the status monitoring and reporting (SMARt) means 60 can be advantageously used to test the integrity of the data path between the system supervisor 2 and end module 15, that data path including the series of connections made by communication network 5, the SCSI chain of cables 31–35, and the intervening modules 10–12. Appropriate test patterns can be sent from the system supervisor 2 to test for shorts, opens, stuck-at faults and so forth, in the chain of interconnects 5, 31–35. Such techniques for verifying network integrity are well known in the art.

Communications between the status monitoring and reporting (SEt) means 60 and the system supervisor 2 are carried out using a communications protocol layered on top of the industry standard SCSI protocol. For example, a first one or more bytes of data that is sent during the data transfer phase of a SCSI SEND or RECEIVE operation defines an operation code field (op code) recognizable to one or both of the SMARt means 60 and the system supervisor 2. A following one or more bytes of data that is sent during the data transfer phase of the SCSI SEND or RECEIVE operation defines parameters of the op code. (The op codes and parameters can be inserted in the CDB (command data block) of a SCSI RECEIVE or SEND operation or in a subsequent one or more data blocks.)

More specifically, when the network control console 102 is the initiator of a data exchange operation and wishes to receive information from the SMARt means 60, it sends the corresponding op code and parameters to first module 10 by way of communication network 5. The op code and parameters sent by the network control console 102 are thereafter embedded by module 10 into the CDB (command data block) of a SCSI RECEIVE command which module 10 sends to the status monitoring and reporting means 60 of module 15 by way of SCSI network cables 31–35. The SMARt means 60 analyzes the embedded op code and parameters and responsively returns the desired data during the data phase of the same SCSI RECEIVE operation. If the network control console 102 wishes to ask the SMARt means 60 to perform a particular operation (e.g., to turn on an LED, not shown, that is attached to cluster 11–15), the network control console 102 sends the corresponding op code and parameters to first module 10 by way of communication network 5. The op code and parameters sent by the network control console 102 are thereafter embedded by module 10 into the CDB (command data block) and/or Data Block of a SCSI SEND command which module 10 sends to the status monitoring and reporting means 60 of module 15 by way of SCSI network cables 31–35. The SMARt means 60 analyzes the embedded op code and parameters and responsively executes the requested operation (e.g., turning on the designated LED).

The op codes and parameters sent from the system supervisor 2 to the SMARt means 60 can include, but are not limited to, commands layered on top of a SCSI SEND command having a format Command{Parameter1, Parameter2, . . . } such as: (1) Report{Voltage level at power terminal of, Module11}; (2) Report{Current level at power terminal of, Module12}; (3) Report{Temperature level inside, Module12}; (4) BeginCableTest{Number5}; (5) Report{Status of, AccessDoor6}; (6) Switch{On, LED_number, 6}; and so forth. The op codes and parameters sent from the SMARt means 60 to the system supervisor 2 can include, but are not limited to, commands layered on top of a SCSI RECEIVE command such as: (1) Warning{Temperature, above 30° C.}; (2) Warning{−Voltage, below 4.8 VDC}; (3) Warning{AccessDoor, Open}; and so forth. Because these op codes and parameters are layered on top of the standard SCSI communications protocol and routed specifically between the status monitoring and reporting (SMARt) means 60 and the system supervisor 2, the OpCodes and {Parameters} do not interfere with other SCSI-based communications between the system supervisor 2 and the remaining modules 10, 11 and 12.

The status monitoring and reporting (SMARt) means 60 can be upgraded to provide active control functions in response to sensed events or commands downloaded from the system supervisor 2. By way of example, in response to a message, Warning{Temperature, above 30° C.} from the SMARt means 60, the system supervisor 2 might respond with an environment control command such Do{Turn, On, ReserveFan}. The upgraded SMARt means 60 will, of course, include appropriate control circuits for carrying out the environmental control actions.

These and other advantages of the architecture shown in FIG. 1A will be better understood by considering the applicability of the architecture to a SCSI-based, data access system.

Figure 1B:
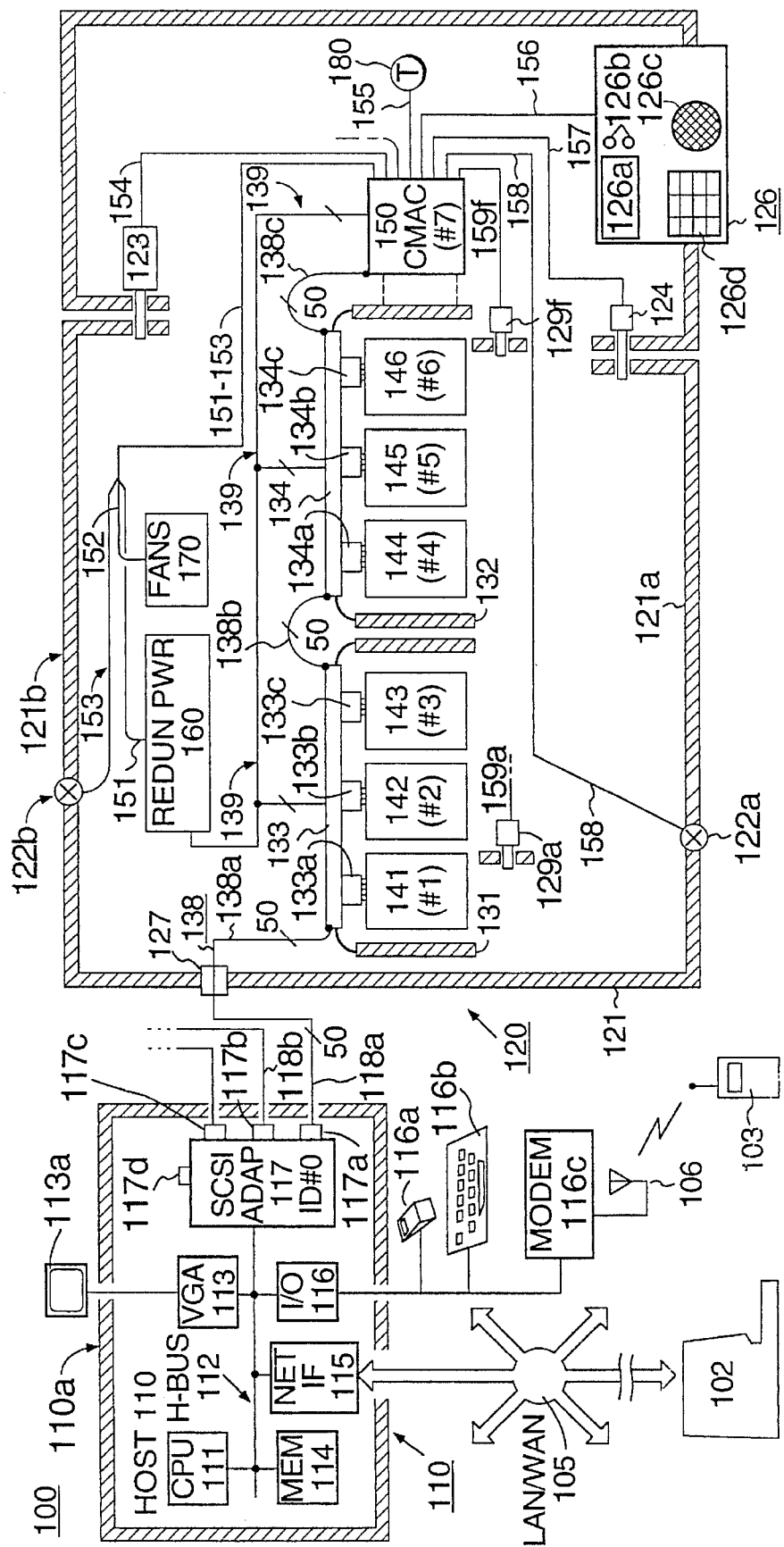
FIG. 1B is a block diagram of a SCSI-based data access network system (DANS) in accordance with the invention.

Referring now to FIG. 1B, a data access network system (DANS) 100 in accordance with the invention comprises as its major components: a local and/or wide area network (LAN/WAN) 105, a host computer 110 and a data storage array subsystem 120, cooperatively coupled as shown with the host computer 110 being sandwiched between the LAN/WAN 105 and the data storage array subsystem 120.

A remotely-located network control console 102 connects by way of the local/wide area network 105 to a network interface module 115 provided within the host computer 110.

A host-internal bus 112 (e.g. EISA or VESA bus) is provided within host computer 110 and operatively coupled to the host-to-network interface module 115. The host-internal bus 112 also connects to a central processing unit (CPU) 111 and to a host-internal memory unit 114 and to a host-to-SCSI adaptor module 117.

A host I/O module 116 is optionally coupled to the internal bus 112 for connecting to one or more serial or parallel input/output devices such as a mouse 116a, a keyboard 116b, and a modem 116c. In this particular embodiment, the modem 116c is advantageously coupled to a wireless paging system comprised of a radio transmitter 106 and a portable paging receiver 103 for the purpose of reporting system problems to a roving administrator as will be explained in more detail below.

A display drive board 113 is further optionally coupled to the internal bus 112 for connecting to an external display (e.g. a Super-VGA monitor). The external display can be used in combination with the mouse device 116a and/or the keyboard 116*b* and/or another user-input device for enabling on-site interactive communication with the host computer 110.

The components of the host computer 110 are enclosed in an appropriate enclosure 110*a* (e.g. an IBM-compatible tower). Typically, the host-internal bus 112 is provided on a motherboard together with the host CPU 111 and RAM/ROM portions of the memory unit 114. The host CPU 111 can be an Intel 80486 66 MHz microprocessor or the like. The host-internal memory 114 typically includes a ROM BIOS for power-up booting and sufficient RAM for loading and using desired software packages. The host-internal memory unit 114 will typically also include a host-internal hard disk (not shown) or other appropriate mass storage means for storing host-specific programs and data.

The host-to-network interface module 115 is typically provided on an expansion board which removably connects to an expansion slot of the host-internal bus 112. Module 115 provides appropriate interfacing between the host-internal bus 112 and the host-external communications network 105 as is well known in the art. The LAN/WAN 105 can operate in accordance with an Ethernet protocol or a token ring protocol or other network architectures known in the art.

The host-to-SCSI adaptor module 117 is also typically provided on an expansion board which removably connects to an expansion slot of bus 112. Examples of such SCSI adaptor boards include those made by Adaptec Inc. of California. The SCSI adaptor module 117 will have at least one SCSI channel connector 117*a* into which a fifty-wire SCSI cable 118*a* (or a wider SCSI-2 cable) connects. Connection is made through an opening in the host computer enclosure 110*a*. The SCSI adaptor module 117 can optionally include additional, second, third, or more SCSI channels which are accessed by way of second, third, etc. SCSI channel connectors 117*b*, 117*c*, etc. Each of these other SCSI channel connectors 117*b*, 117*c*, etc. has its respective SCSI cable 118*b*, 118*c*, etc. extending out from the host enclosure 110*a*.

The data storage array subsystem 120 includes a storage array housing cabinet 121 which houses an array of disk drives 141, 142, etc. and/or an array of other data storage modules (e.g., tape drives).

An internal/external interconnect socket 127 is provided on cabinet 121 for receiving the first-channel SCSI cable 118*a* (a 50-wire SCSI-1 cable or a 68-wire SCSI-2 cable) and for coupling the SCSI signals found on that cable 118*a* onto a cabinet-internal SCSI daisy-chaining system 138. The SCSI daisy-chaining system 138 is composed of removable cable segments 138*a*, 138*b* and 138*c*. These three cabinet-internal daisy-chain cable segments, 138*a*, 138*b* and 138*c*, respectively provide SCSI communication from the cabinet internal/external interconnect socket 127 to-and-through a first-cage backplane 133, to-and-through a second-cage backplane 134, and to a CMAC board 150. A power back-cable 139 carries electrical power to-and-through the first and second cage backplanes, 133 and 134, for powering a plurality of data storage drives 141, 142, etc. The power backcable 139 also connects to and powers other internal components of subsystem 120 and is supplied from a plurality of redundant and modularly replaceable power supplies 160 also housed in cabinet 121.

Cabinet 121 includes a front access door 121*a* and a back access door 121*b* respectively provided at a front and back portions of the cabinet 121. A frontdoor status sensor 122*a*, such as a microswitch, is provided for detecting whether frontdoor 121*a* is open or closed. Frontdoor 121*a* can hinge about the point where sensor 122*a* is provided, or it can open and close according to other suitable fashions. A backdoor status sensor 122*b* is similarly provided for detecting the open/closed status of the cabinet back access door 121*b*.

The number of disk drives 141, 142, etc. or other data storage modules contained within the storage array housing cabinet 121 can be as few as two (2) but it is preferably a number equal to an integer multiple of three such as 3, 6, 9, etc. so that it can support level-5 RAID operations. The number of data storage modules 141, 142, etc. is more preferably a multiple of six such as 6, 12, or 18 for reasons that will become apparent shortly.

When 2 or more data storage modules (141, 142) are provided, it is preferable to provide one or more multi-module support cages 131, 132 within the storage array housing cabinet 121. Each such cage has a pack of 2 or more storage modules (e.g., disk drives) slidably but removably inserted into the cage.

Each cage 131, 132, is itself removable from the storage array housing cabinet 121 such that, when the cage is removed, the pack of data storage modules (e.g., disk drives) 141, 142, etc. contained within the cage is transported without removal from the cage. Also, if there is a CMAC board 150 (described below) attached to the cage, the CMAC board 150 can also be transported without removal from the cage as the cage is removed from the cabinet 121.

In the illustrated embodiment, each of cages 131 and 132 is a tri-disk support cage. A first plurality of as many as three disk drives, 141–143, is inserted into support cage 131 and a second triad of disk drives, 144–146, if present is slidably inserted into the second tri-disk support cage 132. If more drives are to be housed within the storage array housing cabinet 121, additional multi-module support cages (not shown) may be inserted into the cabinet 121 as needed (see FIG. 3B).

First cage 131 has a first printed-circuit board backplane 133 disposed at a rear portion of the cage. The cabinet internal/external interconnect socket 127 removably connects to a left side of the first cage backplane 133 by way of the first daisy-chain cable segment 138*a*. A left end of the second daisy-chain cable segment 138*b* removably connects to a right side of the first cage backplane 133. Second cage 132 similarly has a second backplane board 134 disposed at a rear portion of the cage. The right end of the second daisy-chain cable segment 138*b* removably connects to a left side of the second cage backplane 134. A left end of the third daisy-chain cable segment 138*c* removably connects to a right side of the first cage backplane 133. A right end of the third daisy-chain cable segment 138*c* removably connects to the CMAC board 150.

A triad of SCSI signal and power connectors, 133*a*, 133*b* and 133*c* are provided on backplane 133 for slidably but removably making signal and power connections to respective disk drives 141, 142 and 143. Similarly, a triad of SCSI signal/power connectors 134*a*, 134*b*, and 134*c* are provided on the second cage backplane 134 for slidably but removably connecting SCSI signals and power to respective disk drives 144, 145 and 146. (Pin densities of 72 pins per connector or greater are preferred for each of connectors 133*a*–133*c*, 134*a*–134*c*, so as to allow for expansion from 50-wire SCSI-1 operation to 68-wire SCSI-2 operation.)

Disk drives 141, 142, etc., are modularly replaceable on a "hot-pluggable" basis. Each of drives 141–146 can be inserted into or removed from their respective cages, 131 and 132, by way of the front access door 121*a*. A frontdoor locking solenoid 124 is provided for selectively locking the front access door 121a in a closed position or allowing it to be opened, in response to an electrical command signal (157).

A plurality of individual-drive locking solenoids 129a–129f are optionally provided for locking respective disk drives 141–146 into respective cages 131 and 132 and preventing unauthorized removal of drives 141–146 from their cages even if the front access door 121a is open. Although not shown, a plurality of microswitches can be included in each cage 131, 132 and operatively coupled to the CMAC board 150 for allowing the CMAC board 150 to determine how many and which slots of each multi-disk support cage 131 are physically filled with a drive. This information can be used to support a rudimentary "asset inventory management" function. Under this function, the CMAC board 150 outputs a report onto the SCSI bus 138 indicating how many drives are contained in the cages 131, 132 and which cage slots are filled.

The cabinet back access door 121b provides access to the modularly replaceable, redundant power supplies 160 and also to a plurality of modularly-replaceable, redundant cooling fans 170 provided within cabinet 121. The redundant power supplies 160 preferably include at least two 70 W 110/220 VAC auto sensing power supplies (more preferably 85 Watt 90–240 VAC universal inputting supplies) each providing intelligent 50% load sharing and each switching to full 100%-load support in the event of failure in the other of the power supplies. Each supply should be rated at no less than 65 K hours MTBF (Mean Time Between Failure). The redundant cooling fans 170 preferably include at least two exhausting fans rated at 30 CFM each with a noise rating of no more than 28 db each. Each fan should be rated at no less than 65 K hours MTBF). The fans are arranged to provide mutually independent direct cooling of the redundant power supplies 160 and the drive cages 131, 132.

The individual disk drives 141, 142, etc., can be physically accessed and, when necessary, quickly replaced by opening the front access door 121a. Replacement is performed by sliding a desired drive 141–146 out from its cage 131, 132 and sliding a new drive into the cage for engagement with the corresponding backplane connector 133a–c or 134a–c. The tri-disk support cages 131 and 132 cannot be removed by way of the front access door 121a. Also, the SCSI daisy-chaining cable segments 138a, 138b and 138c, the power backcable 139, the redundant power supplies 160 and the redundant cooling fans 170 cannot be accessed or removed by way of the front access door 121a. Instead, these latter items can only be accessed for replacement or inspection by way of the cabinet back access door 121b. A backdoor locking solenoid 123 is provided for electronically locking the back access door 121b.

A frontpanel messaging module 126 is provided at a front portion of the disk bank cabinet 121, near front access door 121a. The front panel messaging module 126 includes one or more of the following elements: a liquid crystal display panel (LCD) 126a, a plurality of light emitting diodes (LED's) 126b, a speaker or other audio transducer 126c, and a front panel keyboard 126d.

A cabinet monitor and control (CMAC) board 150 is mounted onto a side of one of card cages 131 or 132 (onto 132 in the illustrated case) and operatively coupled to the cabinet SCSI bus 138. Preferably, the CMAC board 150 terminates one end of the SCSI bus 138 and the host-to-SCSI adaptor module 117 terminates an opposed end of the SCSI bus.

The CMAC board 150 is seen as a SCSI peripheral device on the same SCSI channel (118a) that connects to disk drives 141–146 and to SCSI adaptor board 117. The eight device ID (identification) values on the SCSI channel associated with first SCSI channel connector 117a are allocated as follows in one embodiment: The SCSI adaptor board 117 functions as device ID#0, disk drive 141 functions as device ID#1, drive 142 functions as ID#2, drive 143 functions as ID#3, drive 144 functions as ID#4, drive 145 functions as ID#5, drive 146 functions as ID#6, and the CMAC board 150 functions as device ID#7.

These allocations can be rearranged as desired. In a second embodiment the SCSI adaptor board 117 functions as device ID#7, disk drive 141 functions as device ID#0, drive 142 functions as ID#1, drive 143 functions as ID#2, the CMAC board 150 functions as device ID#3, drive 144 functions as ID#4, drive 145 functions as ID#5, and drive 146 functions as ID#6. The main point to note is that the CMAC board 150 functions as one of the SCSI devices on the same SCSI channel that handles data exchanges of the RAID drives 141, 142, etc.

Sense and control connections are made between the CMAC board 150 and various components of the data storage array subsystem 120 for allowing the CMAC board 150 to sense the status of and/or control the status of various components of subsystem 120.

A first status monitor/control connection 151 is made between the CMAC board 150 and the redundant power supplies 160 for allowing the CMAC board 150 to interrogate the operational status of the power supplies and individually control them. The power supply control functions include switching a particular power supply on or off and adjusting an output voltage or output current parameter of the power supply (e.g., changing the output current itself or changing a current limit or threshold value).

A second status monitor/control connection 152 is made between the CMAC board 150 and the redundant cooling fans 170 for allowing the CMAC board 150 to test and/or control the status of individual ones of these fans 170. The fan control functions include switching a designated fan on or off and switching the fan between different fan speeds. The fan monitoring functions include determining the volume of air moving per unit time through a given fan so as to sense proper operation or the build-up of a blockage in an airway.

A third connection 153 is made between the CMAC board 150 and the backdoor status sensor 122b for allowing the CMAC board 150 to determine whether the back access door 121b is in an open or closed state. A fourth connection 154 is made between the CMAC board 150 and the backdoor locking solenoid 123 for electronically operating the backdoor locking solenoid 123.

A fifth connection 155 connects the CMAC board 150 to one or more temperature sensors 180 distributed about subsystem 120. The temperature sensors 180 can be comprised of thermistors or other appropriate elements located at corresponding areas of cabinet 121. These sensors 180 are used for measuring the temperatures of one or more of the following items: (a) the temperature of the first tri-disk support cage 131 as a whole and/or the temperatures of the individual drives 141–143 found in first cage 131; (b) the temperature of the second tri-disk support cage 132 as a whole and/or the individual temperatures of the drives 144–146 found within second cage 132; (c) the temperature of heat-sensitive electronic components (e.g., integrated circuit packages) found on the CMAC board 150; (d) the temperatures of the redundant power supplies 160 taken as a whole or individually; and (e) the air intake and/or air outlet temperature of each of the redundant fans 170.

A sixth status monitor/control connection 156 is made between the CMAC board 150 and the frontpanel messaging module 126 for allowing the CMAC board 150 to output visual indications on the visual indicating devices 126a and/or 126b of the panel 126. Connection 156 can also be used for outputting alarm or other audio output signals through the audio transducer (speaker) 126c. In some instances it may be desirable to have device 126c operate not merely as an audio output device but also as audio input/output transducer, in which case bidirectional audio signals (such as two-way digitized speech or tone-keyed signals) may be carried over connection 156 between CMAC board 150 and audio transducer 126c.

The sixth status monitor/control connection 156 can be also used to monitor the status of panel keyboard 126d and to transfer keystroke entries to the CMAC board 150.

A seventh connection 157 is made between CMAC board 150 and the frontdoor locking solenoid 124 for allowing the CMAC board 150 to control solenoid 124.

An eighth status monitoring connection 158 is made between CMAC board 150 and the frontdoor status sensor 122a for allowing the CMAC board 150 to detect whether the cabinet front access door 121a is in an open or closed state.

When the individual-drive locking solenoids 129a–129f are present, corresponding connections 159a through 159f are made from the solenoids to the CMAC board 150 for allowing the CMAC board 150 to selectively lock any one or more of the drives 141–146 within its cage and thus prevent unauthorized removal. Also, when the above-mentioned "asset inventory management" microswitches are present for detecting which cage slots are filled or not filled with a drive, further appropriate connections (not shown) are made from those switches to the CMAC board 150.

Although not specifically shown, it should now be apparent to those skilled in the art from the above that other status monitor/control connections can be made between the CMAC board 150 and various additional parts of the data storage array (RAID) subsystem 120 for further detecting unusual movements, lights, sounds, voltages, or other significant signals emanating either from the mass storage drives 141–146 themselves or from their surrounding environment.

The environment sense connections 151–159 of the CMAC board 150 should be removably connected to the CMAC board 150, so that in an event where the CMAC board 150 has to be removed and/or replaced, with or without its cage 132, this operation can be carried out easily and quickly.

Figure 2A:
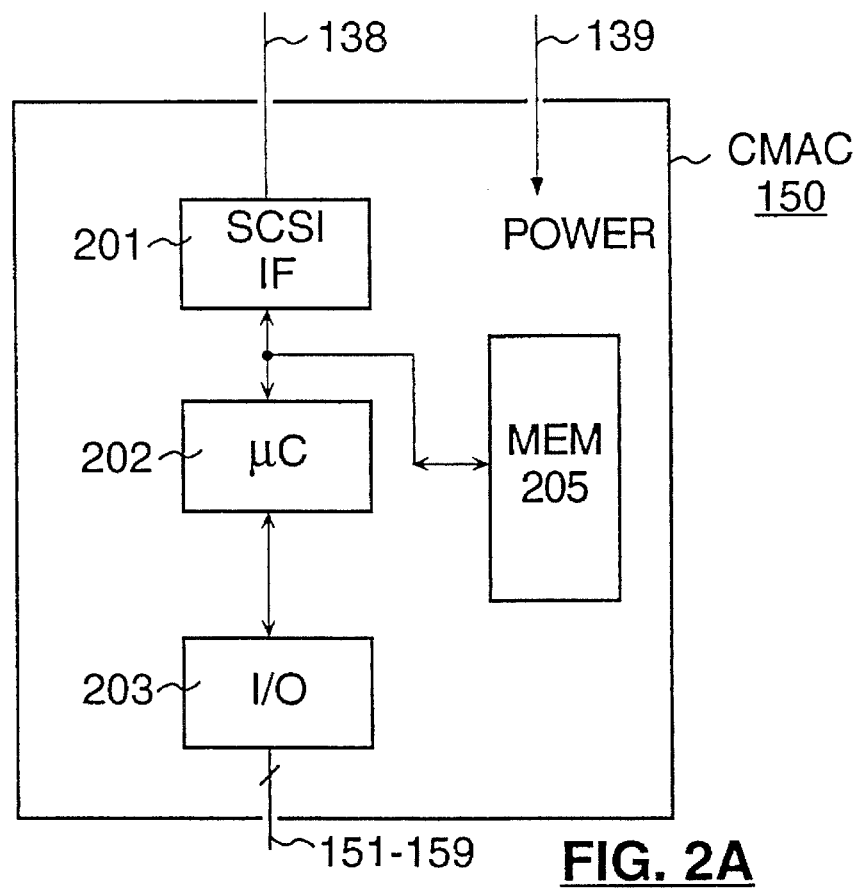

FIG. 2A shows a block diagram of the major components found on the CMAC board 150. The CMAC board 150 comprises a SCSI interface module 201 that operatively connects to the cabinet SCSI daisy-chaining system 138. Board 150 receives its operating power from the power backcable 139. The SCSI interface module 201 connects to an on-board micro-controller 202 (or microprocessor). The microcontroller 202 can be a Zilog Z86E21™ microcontroller available from Zilog Inc. of California or a like device. The Z86E21™ is a single-chip microcontroller containing 8 kilobytes of EEPROM (Electrically Erasable and re-Programmable Read Only Memory) and 236 bytes of general purpose RAM (Random Access Memory). The chip also contains 32 dedicated I/O pins, a full duplex serial port and two counter timers. The serial I/O port on the microcontroller 202 can be used for future expansion of the system. The dedicated I/O pins of the microcontroller 202 connect to a status monitoring/controlling interface circuit 203 further provided on board 150. The status monitoring/controlling interface circuit 203 provides level translation and other appropriate coding or decoding functions for interfacing the microcontroller 202 with the above-mentioned status monitor/control connections 151–159.

The SCSI interface module 201 is preferably a Western Digital WD33C93A™ single chip SCSI interface controller available from Western Digital Inc. of California or a like device. The WD33C93A™ includes an internal microcontroller, a register task file, and SCSI interface logic. All low level SCSI bus protocol operations including SCSI arbitration, bus phase changes, and receive and transfer commands are handled by the WD33C93A™ chip (201). When the SCSI interface module 201 needs higher level assistance, it issues an interrupt signal to the Z86E21™ microcontroller 202. Software loaded into the internal memory of microcontroller 202 services the interrupt. The software within microcontroller 202 also handles handshaking and message protocol operations for receiving messages from or transferring commands to the SCSI interface module 201. The software loaded into microcontroller 202 comes by way of the SCSI daisy-chaining system 138 or from an add-on ROM chip (not shown). This downloaded software provides appropriate access to the status monitor/control connections 151–159 and enables some or all of the various operations described below. Such software is well within the purview of those skilled in the art and no special preferred version of such software exists at this time.

If the on-chip memory of the microcontroller 202 is insufficient, an external memory module 205 can be added to the CMAC board 150 for storing instructions and/or data as desired.

FIG. 2B shows one embodiment 150' in more detail. A VI-sourced termination module 137 couples to SCSI bus 138' adjacent to the SCSI port of a WD33C93A™ chip (201'). A local 8-bit wide data bus 210 is shared by the WD33C93A™ chip (201') and a Z86E21™ microcontroller (202'). The local data bus 210 connects to two banks of 32 K by 8 bit memory, 205a and 205b. A shared control bus 215 selects the data bus of one bank or the other and provides read/write control. The Z86E21™ microcontroller (202') supplies address signals to the 64 K memory module 205a/205b by way of a 16 bit wide address bus 216. Units 201' and 202' are clocked by a 10 MHz oscillator 217. A first interface circuit 218 (e.g., 74LS240) supplies 8 bits of straight or decoded sense data to the Z86E21™ microcontroller (202'). A second interface circuit 219 (e.g., 7406's) outputs 8 bits of control data from the Z86E21™ microcontroller (202'). An RS232 interface circuit 220 (e.g., ICL232) provides bidirectional expansion for further monitor and control operations.

The memory module 205a/205b preferably includes nonvolatile (battery-backed) RAM or Flash-EEPROM which can be loaded with power-up self-diagnostic software, SCSI bus integrity testing software and other software modules that are to be resident independently of the connection to the host computer 110 and the local/wide area network 105. Error history, repair history and usage history data is also preferably stored in the nonvolatile portion of memory module 205a/205b so that one can determine how old the accompanying drives are, how many hours of use time they have accumulated, how many and what kind of errors were encountered either recently or over the life of each drive and what prior repair operations have been performed on each drive.

Also, software should be included in a nonvolatile portion of one or both of the Z86E21™ microcontroller (202') and the memory module 205a/205b for managing receipt of non-SCSI status reports from the interface circuitry (218–220) and for layering the status report into a data portion of a SCSI RECEIVE command block, and for sending the command block to the SCSI interface chip 201' for execution. Furthermore, software should be included in a nonvolatile portion of one or both of the Z86E21™ microcontroller (202') and the memory module 205a/205b for responding to predefined opcodes layered into a data portion of a received SCSI SEND command, where the opcodes ask the CMAC board 150 to report the status of a condition defined by the opcodes or parameters attached to the opcodes, and for causing the microcontroller to respond by transferring the requested status into a data portion of a SCSI RECEIVE command block, and sending the command block to the SCSI interface chip 201' for execution.

Moreover, download support software should be included in the memory of the CMAC board 150' for allowing the download and execution of additional software instructions from one or both of the host computer 110 and the network control console 102.

While the description of FIG. 1B is directed to a six drive configuration, it should be apparent that the described features are applicable to mass storage banks having many more such drives. Groups of three or six drives each are preferably bundled into each individual cabinet 121. Plural groups of six drives may be each bundled into a single cabinet (see FIG. 3B).

Figure 3A:
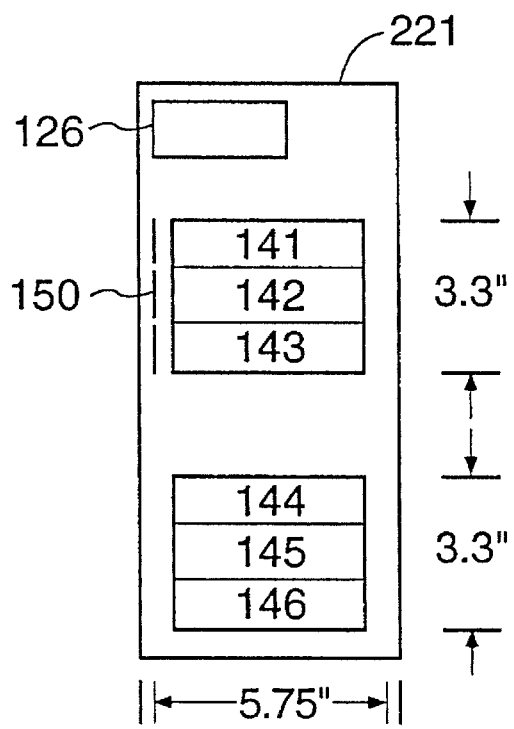
FIG. 3A shows a six drive configuration.

FIG. 3A shows a first possible arrangement in which a single SCSI channel is used for connecting with up to six mass storage drives 141–146 and a CMAC board 150. The seven SCSI devices 141–146, 150 are all enclosed within a double full height enclosure 221. The enclosure 221 is shaped as a vertical tower and the tri-disk support cages (131,132, not shown) are stacked one on the next. The front panel messaging module 126 is positioned at a top left portion of the tower 221. The CMAC board 150 is fastened to a left side of the top cage (131).

The CMAC board 150 is sized to allow the combination of cage 131 and attached board 150 to slip into a standard 5¼ form factor, full-height drive bay of an IBM-PC compatible computer. Such a full-height bay typically measures 5.75 inches in width, 3.35 inches in height and 8 inches in depth. The three individual disk drives 141–143 that slide into cage 131 each measure 1.0 inch or less in height and have form factors of 3.5 inch or less (e.g. Conner CP-30540™ disk drives available from Conner Peripherals Inc.). This arrangement leaves at least 0.35 inch of height space to be used for providing tolerance spacing between the drives and tolerance spacing between the cage and the full-height bay.

In one embodiment a main body portion of the tri-disk support cage is 3.30 inches high, 4.75 inches wide and 7 inches deep. The one inch space between the 4.75 inch width of the cage body and the 5.75 inch width of the full-height drive bay is used to accommodate the CMAC board 150 and other electronics boards (such as a status messaging board, not shown) that may also mount to the side of the cage body and fit within the one inch space.

Figure 3B:
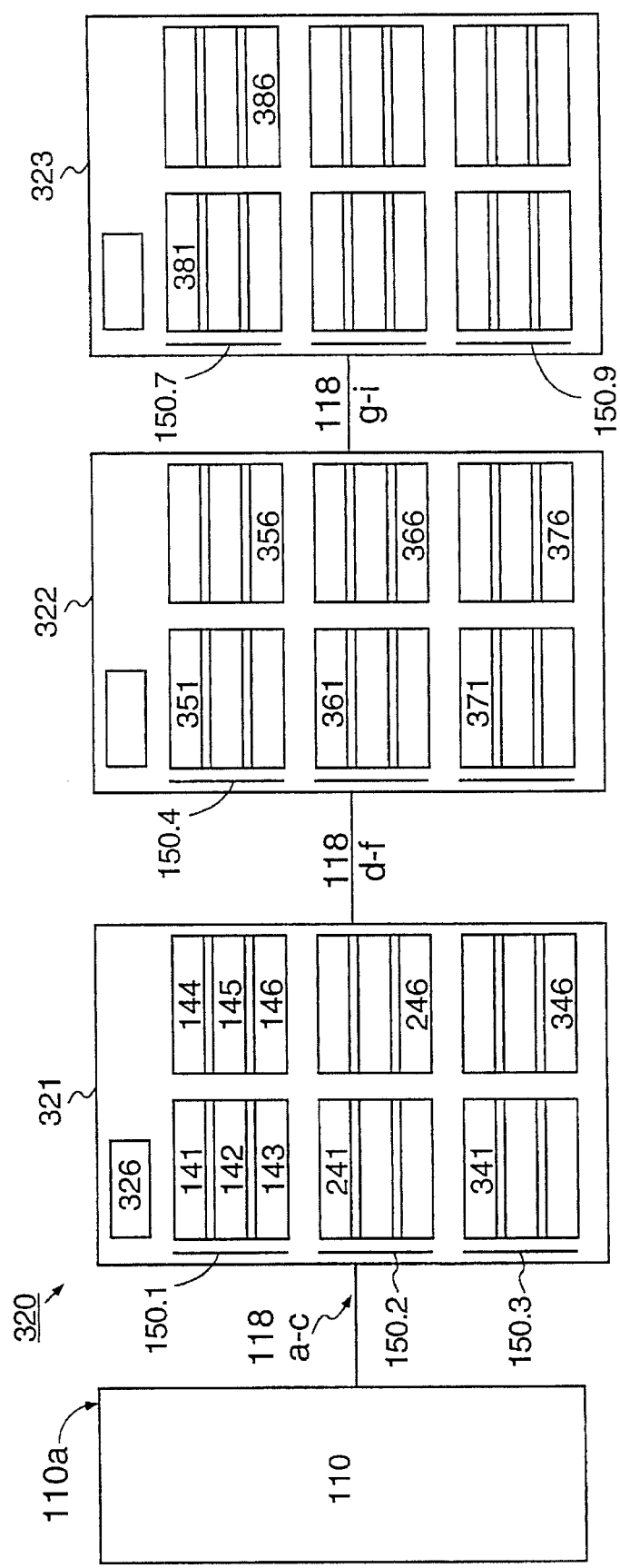
FIG. 3B shows a bank of drive cabinets each holding eighteen drives.

FIG. 3B shows another possible arrangement in which each enclosure 321, 322, 323, etc. of multiple enclosures houses eighteen mass storage drives. Three SCSI channels are used for each enclosure to access the corresponding 18 drives and their three associated CMAC boards (150.1, 150.2 and 150.3). The CMAC boards 150.1–150.3 mount on the left sides of the left drive cages. A common messaging panel 326 is positioned near a top left portion of each enclosure 321, 322, etc. Each enclosure 321, 322, etc. is a triple full height, double wide enclosure capable of receiving six cage assemblies where each of the cage assemblies is tri-disk support cage such as 131.

The multiple-enclosure arrangement shown in FIG. 3B will typically be enclosed in a utility closet within an office building or warehouse. A client/server computer 110 will be housed in a first tower enclosure 110a while tower enclosures 321, 322, 323, etc. house the corresponding mass storage drives of client/server computer 110. This arrangement may be repeated many times in a large warehouse full of mass storage drives and host computers.

The utility closet or warehouse will be typically situated far away from the person or persons who are in charge of monitoring and maintaining the RAID system. If a particular enclosure (110, 321, 322 or 323) needs physical servicing, a moderately-skilled technician is dispatched to the utility closet or warehouse for performing field replacement services on a modular level. In other words, if a particular disk drive (e.g. 141) has failed, the technician will be dispatched to remove the failed drive (e.g. 141) and insert a substitute drive. If one of the redundant power supplies 160 has failed, the technician will remove the failed power supply and replace it with a fresh power supply. A similar replacement operation is used for redundant cooling fans 170.

Servicing preferably takes place in a "hot-pluggable" state, meaning that power continues to be applied to the other non-failing units as servicing takes place and the other units continue to operate in a normal or semi-degraded fashion while the failed unit is replaced.

In the case where the double wide enclosures 321, 322, etc., are used, each enclosure preferably includes at least two 200 W 110/220 VAC modular/user replaceable power supplies (and more preferably 250 W 90–240 VAC universal inputting supplies) with intelligent load sharing and switching to full-load support in the event of a single supply failure. The supplies are powered by independent AC input lines (not shown). At least three modular/user replaceable exhaust fans (not shown) are provided with a rating of 33 CFM each and with a noise rating of no greater than 28 db each. Minimum MTBF for the power supplies and fans should be at least 65 K hours.

Physical access to the internal components of the data storage array subsystem (120 or 320) during normal operations is blocked by closing doors 121a, 121b and actuating the frontdoor and backdoor solenoids 124 and 123 to lock their respective access doors 121a and 121b. Even though the components are physically locked away, a remotely-located network supervisor (102) can nonetheless monitor conditions within the data storage array subsystem (120 or 320) by routing status queries from the network control console 102, over the network 105, through the network interface 115 and through the SCSI adaptor module 117 to a desired CMAC board 150. The transmitted queries can enquire about the operational status of each of the redundant power supplies 160, each of the redundant fans 170, the open/close status of the front and back access doors 121a and 121b, temperature conditions in various parts of the data storage array subsystem (120/320), and so forth.

In response, the addressed CMAC board 150 uses its status monitoring connections 151–158 to detect the desired status. The CMAC board 150 transmits the requested status information back over the cabinet SCSI daisy-chaining system 138 and through SCSI connector 118a, SCSI adaptor board 117, host bus 112, network interface 115 and network 105, to the inquiring console 102. In one embodiment, returned status and alert reports are encoded into an industry-standard format known as SNMP (Simple Network Management Protocol).

If excessive thermal build-up is detected within an enclosure (121 or 321), a corrective command can be sent from the remote console 102 to the corresponding CMAC board 150 asking the CMAC board 150 to switch on an additional cooling fan 170 or increase the speed of an already turned on fan in order to better cool the enclosure.

If an access door (121a or 121b) is sensed as being ajar, an alarm command can be sent from remote console 102 to the CMAC board 150 of the affected enclosure 121/321 for actuating an audible alarm signal through audio transducer 126c and/or a flashing visual indication to visual indicators 126a and/or 126b so as to frighten away an unauthorized intruder and/or to help a later-arriving technician identify the specific enclosure having a door that is not properly closed. Upon arrival, the technician will easily be able to determine which enclosure is affected by listening for the audible alarm and/or looking for blinking visual indicators (e.g. blinking LED's 126b). The visual and/or auditory alarms might be arranged to indicate specifically which door is being sensed as being ajar, the front, the back or both.

The same alarming system can be used for isolating an enclosure containing a component that needs other types of servicing. In the case where the LCD panel 126a is present, the network supervisor may choose to send a message to the technician from remote console 102, by way of the network 105 and the CMAC board 150, such that the message is displayed on the LCD panel 126a. The message might indicate exactly what component needs to be inspected or replaced.

It is possible that a system supervisor or service technician will be away from, or not monitoring the network control console 102, when a condition worthy of alarm is detected by the CMAC board 150 and signalled to the console 102. In such a case, it is advantageous to install paging software in the host computer 110 for sending a corresponding pager message to the portable paging receiver 103 of the system supervisor and/or service technician when an alarm of sufficient priority is detected passing from the CMAC board 150 to the network control console 102. A telephone touch-tone service may be used to not only alert the absent/roving supervisor/technician to call in, but in some cases, touch-tone codes can be used to generate specific messages such as "power supply 002 failed in cabinet 003" on a LCD (liquid crystal display) panel of the portable paging receiver 103. Then, the absent/roving supervisor/technician can immediately proceed to the trouble site without having to make further inquiries through a network control console 102.

The CMAC board 150 may be programmed to act as a requester for any one of drives 141–146 so that the operability of any one of these drives 141–146 may be periodically tested by the CMAC board 150 without burdening the throughput of the LAN/WAN 105. This testing operation is preferably carried out when the CMAC board 150 senses that the cabinet SCSI daisy-chain system 138 is in a quiescent state and no communication is ongoing between the local SCSI adaptor board 117 and the drives 141–146 that are to be monitored by the CMAC board 150. The CMAC board 150 can then try to engage in a limited conversation with each of drives 141–146 just to see whether each of those drives appears to be minimally operational. If one of the drives appears to be non-operational, the CMAC board 150 can send a warning message over the cabinet SCSI daisy-chaining system 138 and through the LAN/WAN network 105 to the network supervising console 102 warning of the problem.

Another function which the CMAC board 150 can undertake when the cabinet SCSI daisy-chain system 138 is in a quiescent state is inventory-taking. Each data storage module within the storage array housing cabinet 121 can be provided with an ability to report its brand name (e.g., Conner CP30540™) over the SCSI bus 138 to the CMAC board 150 in response to a version/capacity request output by the CMAC board 150. The response can included not only the brand name of the data storage module, but also its serial number and details about its storage capacity such as how many bytes are used and how many are free in the module as a whole or even in specific directories. A similar capability reporting function can be built into the modularly-replaceable redundant power supplies 160 and other environment support devices (e.g., the fans 170) of storage array housing cabinet 121. The CMAC board 150 will periodically take inventory (preferably during a quiescent state) of how many drive-support slots in each cage 131, 132 are full or empty, what brand or brands data storage modules are contained in the storage array housing cabinet 121, what power supply and cooling capabilities are available, and so forth. This inventory report can be downloaded to the network control console 102 either periodically or on request so that the manager of a large, ever changing network can get an idea of what is "out there" in terms of number of units, their storage capacities, how much free space is left, where potential storage overflows or underutilizations are developing, and so forth.

Additionally, the CMAC board 150 can be given the task of logging problems for each brand/kind of data storage module and/or power supply and/or other device within its storage array housing cabinet 121. Then when the network supervisor (102) asks for an inventory report, the CMAC board 150 can provide a log of problems for each device. This will help the network supervisor (102) to better perform his or her asset inventory and management duties, part of which is knowing what is "out there" and how is each component of the network behaving in terms of mean-time-between failures, utilization, etc.

Also, in some networks, there are different storage configurations at each site. One six-pack of disk drives might be operating as two level-5 RAID banks while another 6-pack is operating as three level-0 RAID banks. The CMAC board 150 can be asked to keep track of the configuration within its domain and to report this configuration to the network manager periodically or on request.

Logging operations can take place when the host-to-SCSI adaptor module 117 has control of the SCSI channel and is engaged in conversation with one of the plural drives 141–146. The CMAC board 150 may listen in to determine traffic patterns, to detect fatal error messages or the occurrence of a number of non-fatal transaction errors exceeding a predetermined value.

If a fatal error or an excessive number of nonfatal errors is detected for one of the drives 141–146, the CMAC board 150 may even be programmed to initiate a recovery and rebuild operation. It may be programmed to at the same time send an alarm message to the network supervisor through one or both of the network control console 102 and the portable paging receiver 103.

In some instances, a cabinet 121 can have 3 drives operating as a level-5 RAID system and one or two unused drives sitting in reserve. If the CMAC board 150 senses that one of the active RAID drives is beginning to have an error rate exceeding a predefined threshold, the CMAC board 150 can initiate a copy of the data in the failing drive into one of the spare drives, and at the appropriate moment (a bus quiescent moment), switch the back-up drive into the RAID triad (level-5) while removing the failing drive. The CMAC board 150 would inform the host computer 110 of this event-driven switch so that the host readjusts the SCSI ID's that define the RAID bank. The CMAC board 150 would also inform the network control console 102 of this switch so that the network manager is aware of the problem and the reconfiguration. If there are only 3 drives in the RAID bank and one drive is failing, the CMAC board 150 might switch the configuration from RAID level-5 to RAID level-0 (providing there is enough free storage space to support the switch without loss of data).

With regard to background monitoring of traffic patterns, this information can be useful to the network manager so the manager can determine whether additional storage capacity should be added to the network; whether traffic should be redirected in order to more homogeneously load system resources; and/or whether usage traffic to a drive containing licensed software is sufficiently high or low that it would be worthwhile to upgrade or downgrade the terms and cost of a corresponding software-usage licensing agreement.

Those skilled in the field of RAID systems know that RAID level zero operation can be implemented with just two disk drives, each mirroring the data contained in the other. RAID level 5 operation can be implemented with as few as three drives 141–143. If one of the drives fails, the remaining non-failed drives can continue to supply user-desired information, although perhaps at a degraded performance rate. If yet another disk drive fails in the RAID 0 or RAID 5 configuration, it will no longer be possible to rebuild the lost information. Accordingly, when a first failure occurs, it is desirable to bring the failed drive back into an operational mode as soon as possible in order to minimize the danger of permanent data loss. The operational mode might be attained by simply rebuilding the lost data in the failed drive from the data held in the non-failed drives. Such a rebuild can be used without need for replacement, providing that the failure mechanism is of a temporary nature. If the failure mechanism is of a more permanent nature (e.g. a head crash), the failed drive needs to be physically replaced with a new, operational drive and the data of the removed drive needs to be rebuilt into the replacement drive. The CMAC board 150 may be programmed to initiate a rebuild without replacement on its own rather than burdening the network controller 102 with overseeing such a task. A set of indicator lights may be provided on the CMAC board 150 or on the frontpanel messaging module 126 to indicate the data integrity status of each drive. By way of example, a lit green LED might indicate that the corresponding drive is good, red might indicate it is bad and flashing red or green might indicate it is being rebuilt. If a rebuild operation is unsuccessful after one or a predetermined number of tries, the CMAC board 150 can then alert the network controller 102 that higher level intervention is required.

The system 100 shown in FIG. 1B may be advantageously used to make sure that routine installation, maintenance and module replacement operations are carried out in a relatively fool proof manner and that unauthorized personnel are deterred from physically accessing the components within each enclosure 121/321. When an authorized technician is dispatched to replace a failed component in a data storage array subsystem 120/320, the technician is first asked to locate the affected enclosure by looking for a certain pattern of visual and/or auditory indicators (e.g. flashing red LED's and/or a particular alarm tone). Then the technician is asked to key in a prearranged password into the panel keyboard 126d of the thusly identified enclosure. A new and unique password can be periodically downloaded over the network 105 into each CMAC board 150 (150.1, 150.4, 150.7 etc., see FIG. 3B) in order to increase system security and assure that the technician opens the correct enclosure. If the technician keys in the correct password, the CMAC board 150 responds by unlocking a predesignated one or both of the front and back access doors 121a and 121b. The network supervisor can command the CMAC board 150 from the remote console 102 as to which of the cabinet access doors, 121a or 121b or both, is to be opened. If a wrong password is entered, the CMAC board 150 might activate a warning alarm.

Upon detecting that the appropriate access door 121a and/or 121b is being opened, the CMAC board 150 can issue a command over the SCSI bus 138 to the enclosed drives 141–146 to place them in a quiescent state. The quiescent state temporarily blocks the SCSI adaptor module 117 within the host 110 from accessing drives 141–146. The CMAC board 150 takes control of the SCSI bus 138/118a at this time. This avoids the danger that noise will be introduced into data transfers due to connector jiggle or other mechanisms while the technician slides a failed component out and replaces it with a fresh component. The invocation of this temporary quiescent state is optional.

The network supervisor (102) can send a message to the technician by way of display panel 126a to indicate exactly which drive is to be replaced. Alternatively, identifying LED's may be placed on individual ones of drives 141–146 or on the side of the tri-disk cage 131. The CMAC board 150 can be instructed from the remote console 102 to cause the LED on the failed unit to blink in a particular pattern, thereby helping the technician to more quickly isolate the failed unit.

The optional drive locking solenoids 129a–129f may be used to provide a further safeguard against removal of an incorrect drive. The network supervisor (102) can command the CMAC board 150 to unlock the solenoid 129a, 129b, etc., of only the failed drive while leaving the remaining solenoids 129 in the locked position. Thus, even if the technician inadvertently tries to remove the wrong drive, the technician will be blocked from doing so by the drive locking solenoid 129. Only when the technician pulls on the appropriate drive will the technician find that this drive is easily removable from its corresponding support cage, 131 or 132.

Although not shown, it is to be understood that similar indicating means can be provided for allowing the CMAC board 150 to indicate which of the redundant power supplies 160 or redundant cooling fans 170 has failed and for preventing the technician from incorrectly removing another one of these units which has not failed.

When a service job is reported to have been completed, by for example the technician keying in a completion code into key panel 126d, the network supervisor 102 can use the CMAC board 150 to run a plurality of status and diagnostic checks; making sure that each of the drives 141–146 is operational; making sure that the front and back access doors 121a–121b are properly closed and locked, making sure that each of the redundant power supplies 160 is operational, making sure that each of the redundant cooling fans 170 is operational and making sure that temperature or other environmental conditions within the enclosure 121 have returned to normal. The network supervisor (102) can then signal the technician by way of LCD panel 126a and/or LEDs 126b that the enclosure is now fully operational and that the technician may now leave the service site and proceed to a next maintenance job.

Once the enclosure checking procedure is complete, the CMAC board 150 can be commanded from the remote console 102 to take drives 141–146 out of the quiescent state and to again let the host SCSI adaptor module 117 have full access to the data within drives 141–146. It should be understood of course, that the quiescent state is an optional operation. Each of drives 141–146, power supplies 160 and cooling fans 170 is "hot-pluggable", meaning that it can be replaced while the remaining components within the affected enclosure 121 continue to operate either at full or at a slightly degraded performance rate.

The above scenario is merely an example of the type of locally-observed and remotely-observed status indications that can be provided by the CMAC board 150. The frontpanel keyboard 126d can be used to locally-initiate status reporting operations or diagnostic operations or access-grant and reconfiguration operations in place of remotely-initiation by the network supervisor (102) of such operations.

In some cases, it may be desirable to remove an entire cage (e.g., 132), with a CMAC board 150 still attached to the cage, from the storage array housing cabinet 121 and to return the removed unit to the shop for failure analysis and repair. This may be the case for example when a failure occurs in a non-replaceable portion of a cage 131, 132 such as in its backplane 133, 134 or in the cabinet monitor and control (CMAC) module 150 itself. The CMAC board 150 may be provided with nonvolatile storage (e.g., flash EEPROM) in which it stores failure history information such as the time of failure, what operations were being performed at and shortly before the failure and so forth. This information may help technicians to better diagnose and repair a problem. When a repaired cage is returned to the field, the nonvolatile portion of the CMAC board 150 can be programmed to contain repair-history information. The error and repair history of each cage can then travel with the cage as it is pulled from one system and later installed in another. An overly-troublesome cage or drive can be isolated through the use of this information and weeded out from the network. In this way the network supervisor can avoid repeated reattachment of an overly-troublesome cage or drive to the network.

The CMAC board 150 can be used advantageously during first time installation as well as in post-installation repair and recovery. When a new data storage array is first attached to a host computer 110, some of the connections 117a, 127, etc. may be faulty or a fault may lie in one of the cables 118, 138a, 138b, etc. The CMAC board 150 is preferably situated at the terminal end of the SCSI bus 138 furthest away from the host-to-SCSI adaptor module 117.

On power-up, the CMAC board 150 performs self-diagnostics, making sure its own power supply, CPU, memory, I/O circuits and so forth are operational. If a failure is detected, a predefined pattern of lights or other indicators is displayed on frontpanel messaging module 126 so that an on-site technician can determine what has gone wrong.

After power-up self-diagnostics are completed by the CMAC board 150, a data path integrity check can be initiated by the on-site technician keying-in a predefined test code into the frontpanel keyboard 126d or the CMAC board 150 can automatically enter such a test phase on its own. In the data integrity test phase, the CMAC board 150 looks for a predefined set of test patterns to be transmitted from the host-to-SCSI adaptor module 117 to the CMAC board 150 over the SCSI bus 138. The test patterns are selected as known in the art to detect and/or isolate common connection problems such as shorts, opens, stuck-ats, etc. If a data path integrity fault is detected during this phase, the CMAC board 150 will flash a corresponding and predefined pattern of lights and/or alarm tones and/or other indicators out over the frontpanel messaging module 126. This will indicate to the on-site technician that a data path integrity problem exits and perhaps even isolate its location. Once the data path integrity is verified as being fault-free appropriate software can be downloaded into the CMAC board 150 from the network control console 102 for carrying out various other functions.

By way of summary, the above disclosure has shown among other things: (a) how a cabinet monitor and control (CMAC) board 150 can be used to provide on-site reports of the status and problems of a data storage array to an on-site technician (e.g., by creating appropriate indication patterns on the frontpanel messaging module 126) and on-site control over various operational aspects of the array; (b) how the CMAC board 150 can be used to provide off-site reports of array status and problems to a remote system supervisor (102, 103) and remote control over various operational aspects of the array; (c) how the CMAC board 150 can be used to test the data path integrity of the SCSI bus; (d) how the CMAC board 150 can be used to convey error history, repair history and other information about a portable pack of data storage modules (e.g., disk drives) to which the board 150 is attached; (e) how the CMAC board 150 can be used to support inventory/asset management functions in a large network; (f) how the CMAC board 150 can be used to monitor usage traffic patterns among an array of data storage modules and/or switch storage configurations in response to degradation events; (g) how the CMAC board 150 can be used to monitor and manage environmental aspects of array operation such as maintaining appropriate temperature, maintaining power levels, and assuring system security in a background mode without burdening the network supervisor (102) or the host computer (110) with such tasks.

The above disclosure is to be taken as illustrative of the invention, not as limiting its scope or spirit. Numerous modifications and variations will become apparent to those skilled in the art after studying the above disclosure.

By way of example, one or more tri-drive cages 131, 132 can be installed in the drive bay of host computer 110 rather than in separate cabinet 121. The CMAC board 150 would be attached to the side of one such cage 131 or 132 in this instance and a host-internal connector 117d of SCSI adaptor board 117 would be used to communicate with the host-internal CMAC board and its associated drives 141, 142, etc.

By way of further example, the redundant array of data storage units does not have to be composed of magnetic disk drives. It can include re-writable optical drives, tape drive units or other forms of redundant data storage. A triad or six-pack of disk drives can have a half-height DAT (Digital Audio Tape) drive attached thereto for performing data backup. The DAT drive could co-exist on the same SCSI ID as the CMAC board 150 or have its own SCSI ID number. (In the latter case, the number of disk drives on the SCSI channel would have to be reduced to 5.) The CMAC board 150 can be programmed to support tape back-up operations as well as RAID operations. Moreover, one can have a bank of SCSI-responsive DAT drives in place of a bank of disk drives, with the DAT drives providing either primary or back-up storage. The CMAC board 150 can be used to manage such a DAT bank in similar manner to a disk bank.

Given the above disclosure of general concepts and specific embodiments, the scope of protection sought is to be defined by the claims appended hereto.

What is claimed is:

1. A redundant data storage system comprising:

a data exchange bus;

a plurality of data storage means removably supported in a plurality of physical-support slots, said plurality of data storage means being for redundantly storing a body of data, each storage means being operatively coupled to the data exchange bus; and status defining means also operatively coupled to the data exchange bus, the status defining means being further operatively coupled to a selected one or more of the plural data storage means and the physical-support slots for sensing a local status of the selected one or more of the plural data storage means and the physical-support slots, said local status being one that cannot be otherwise determined by way of the data exchange bus and the status defining means being further for reporting the sensed local status to the data exchange bus;

wherein said local status includes one or more parameters selected from the group consisting of:

(a) a local power voltage level inside a specified one of the selected plural data storage means;

(b) a local power current level inside a specified one of the selected plural data storage means;

(c) an amount of deviation from a prespecified nominal value for a local power voltage level inside a specified one of the selected plural data storage means;

(d) an amount of deviation from a prespecified nominal value for a local power current level inside a specified one of the selected plural data storage means;

(e) a temperature level inside a specified one of the selected plural data storage means;

(f) a temperature condition inside a specified one of the selected plural data storage means that is outside of a predefined range;

(g) a presence within a specified one of the selected plural physical-support slots of a corresponding data storage means;

(h) a local removability from a specified one of the selected plural physical-support slots of a corresponding data storage means; and (i) an abnormal sound emanating from one of the selected plural data storage means.

2. The system of claim 1 wherein the data exchange bus is a SCSI (Small Computer System Interface) bus.

3. The system of claim 2 wherein the plural data storage means define a RAID system.

4. The system of claim 2 wherein each of the plural data storage means and the status defining means has a unique SCSI device identification number.

5. The system of claim 2 wherein a SCSI-to-host adaptor device is further coupled to one terminal end of the SCSI bus and wherein the status defining means is coupled to an opposed second terminal end of the SCSI bus.

6. The system of claim 5 wherein the SCSI-to-host adaptor device and the status defining means cooperate to test the data path integrity of the SCSI bus portions disposed between them.

7. A redundant data storage system according to claim 1 further comprising a support cage having a plurality of said physical-support slots each for supporting a corresponding one of the plural data storage means, the support cage further supporting the status defining means, wherein the plural data storage means are each modularly removable from the support cage.

8. A redundant data storage system according to claim 7 wherein each of the plural data storage means is modularly removable from the support cage on a hot-pluggable basis.

9. A redundant data storage system according to claim 7 wherein the combination of the support cage, the plural data storage means, and the status defining means, is sized to slip into a standard 5¼ inch form factor, full-height drive bay of an IBM-PC™ compatible computer.

10. The system of claim 7 further comprising:

housing means for securely enclosing the supporting cage and plural data storage units and the status defining means, said housing means having one or more access means by which physical access may be obtained to the components securely enclosed in the housing means;

wherein the status defining means includes means for monitoring the one or more access means and for determining whether physical access is immediately obtainable to one or more components enclosed in the housing means by way of the one or more access means.

11. The system of claim 10 wherein the one or more access means each includes locking means for preventing immediate physical access to a corresponding one or more components enclosed in the housing means; and wherein the status defining means includes means for selectively switching the locking means between locked and unlocked states.

12. The system of claim 1 further comprising a plurality of redundant power supplies for supplying continuous power to the plural data storage units and to the status defining means even in the event where one of the redundant power supplies fails;

wherein the status defining means includes means for detecting and reporting degradation in the voltage or current supplying capabilities of one or more of said plurality of redundant power supplies.

13. The system of claim 1 further comprising a plurality of redundant fans operatively coupled to each of the plural data storage means for redundantly providing a flow of cooling air at a desired volumetric flowrate to each of the plural data storage means even in the event that one of the redundant cooling fans fails;

wherein the status defining means includes means for detecting and reporting degradation in the flowrate providing capabilities of one or more of said plurality of redundant fans.

14. The system of claim 1 further comprising:

a first supporting cage for transportably housing two or more of said data storage means, the first supporting cage having connectors removably connected to the data exchange bus so that the two or more data storage means housed within the first supporting cage can be disconnected from the data exchange bus and transported away while housed in the first supporting cage;

wherein the status defining means is also removably connected to the data exchange bus so that the status defining means can be disconnected from the data exchange bus and transported away together with the first supporting cage; and wherein the status defining means includes information storage means for storing information about the two or more data storage means housed within the first supporting cage.

15. The system of claim 14 wherein the stored information defines one or more of: (a) a usage history describing past usage of the data storage means housed within the first supporting cage; (b) an error history describing past operating errors experienced by the data storage means housed within the first supporting cage; and (c) a repair history describing past repair operations performed on the data storage means housed within the first supporting cage.

16. The system of claim 14 further comprising a second support cage for transportably housing one or more additional ones of said data storage means, the second supporting cage having connectors removably connected to the data exchange bus so that the one or more additional data storage means housed within the second supporting cage can be disconnected from the data exchange bus and transported away while housed in the second supporting cage;

wherein the status defining means is adapted for being transported away from the data exchange bus together with the second supporting cage; and wherein information storage means of the status defining means includes means for storing additional information about the one or more additional data storage means housed within the second supporting cage.

17. The system of claim 16 wherein the status defining means is physically joined to the first supporting cage and the stored information defines one or more of:
   (a) a usage history describing past usage of the additional data storage means housed within the second supporting cage;
   (b) an error history describing past operating errors experienced by the data storage means housed within the second supporting cage; and
   (c) a repair history describing past repair operations performed on the data storage means housed within the second supporting cage.

18. A cluster of SCSI modules coupled to one another by a SCSI bus, each SCSI module having a respective local power status defined by a local power voltage level and a local power current level delivered to internal circuitry within the module, wherein at least one of the SCSI modules has no means for directly reporting to the SCSI bus, the status of local power delivered to internal circuitry of the at least one SCSI module and wherein a second of the SCSI modules includes:

status monitoring and reporting means, operatively coupled to the at least one SCSI module, for monitoring and reporting to the SCSI bus, at least one of the local power voltage level and the local power current level being delivered to internal circuitry of the at least one SCSI module.

19. The SCSI cluster of claim 18 wherein:

each SCSI module has a respective local temperature status defined by at least one temperature level developed within the internal circuitry of the SCSI module:

said at least one of the SCSI modules has no means for directly reporting to the SCSI bus, the local temperature status of the internal circuitry of the at least one SCSI module; and said status monitoring and reporting means is further for monitoring and reporting to the SCSI bus, the local temperature status of the at least one SCSI module.

20. The SCSI cluster of claim 18 wherein:

each SCSI module can be caused to be manually removable from said cluster and the manual removability of each SCSI module is defined by a local locking means and;

said status monitoring and reporting means is further for monitoring and reporting to the SCSI bus, the manual removability status of the at least one SCSI module.

21. The SCSI cluster of claim 18 wherein the SCSI bus is further coupled to an externally controllable SCSI module and wherein the status monitoring and reporting means includes:

SCSI bus integrity testing means for testing, in cooperation with the externally controllable SCSI module, the integrity of the SCSI data path between the externally controllable SCSI module and the second SCSI module.

22. The SCSI cluster of claim 21 wherein the externally controllable SCSI module and the second SCSI module are positioned at opposed operative ends of the SCSI bus.

23. The SCSI cluster of claim 18 wherein the at least one of the SCSI modules is a magnetic disk drive.

24. The SCSI cluster of claim 18 wherein the at least one of the SCSI modules is part of a RAID bank.

25. The SCSI cluster of claim 18 wherein the at least one of the SCSI modules is a tape drive.

26. The SCSI cluster of claim 1 wherein the status monitoring and reporting means comprises:

SCSI interface means, coupled to the SCSI bus, for managing SCSI bus phases;

status monitoring interface circuitry operatively coupled to monitor the status of local power delivered to internal circuitry of the at least one SCSI module; and a microcontroller, coupled to the SCSI interface means and to the status monitoring interface circuitry, for receiving non-SCSI power status reports from the interface circuitry and for layering the power status reports into a data transfer phase block to be used in a SCSI SEND or RECEIVE operation, and for causing the SCSI interface means to include the data transfer phase block having said status report layered therein, within the data transfer phase of a corresponding SCSI SEND or RECEIVE operation.

27. The SCSI cluster of claim 9 wherein the microcontroller is responsive to a predefined opcode layered into a command data block (CDB) portion of a received SCSI RECEIVE communication, the opcode asking the microcontroller to report the status of a power-related condition defined by the opcode or parameters attached to the opcode, and the microcontroller transferring the requested status into a corresponding data transfer phase block to-be included in the data return phase of said SCSI RECEIVE communication, and sending said data transfer phase block to the SCSI interface means for inclusion in the data return phase of said SCSI RECEIVE communication.

28. The SCSI cluster of claim 18 wherein a variable power supply delivers power to the at least one SCSI module and wherein the second of the SCSI modules further comprises:

power control means, operatively coupled to the variable power supply of the at least one SCSI module and responsive to commands received over the SCSI bus, for controlling the level of power delivered to internal circuitry of the at least one SCSI module.

29. The SCSI cluster of claim 19 wherein a first variable speed fan supplies a flow of cooling air to the at least one SCSI module and wherein the second of the SCSI modules further comprises:

fan control means, operatively coupled to the first variable speed fan and responsive to commands received over the SCSI bus, for varying the speed level of said first variable speed fan.

30. The SCSI cluster of claim 20 wherein said local locking means is electrically controllable and wherein the second of the SCSI modules further comprises:

lock control means, operatively coupled to the local locking means and responsive to commands received over the SCSI bus, for automatically locking and unlocking said local locking means.

31. A redundant data storage system comprising:

a data exchange bus for connection to an external host controller;

a plurality of data storage means removably supported in a plurality of physical-support slots, said plurality of data storage means being for redundantly storing a body of data, each storage means being operatively coupled to the data exchange bus; and status defining means also operatively coupled to the data exchange bus, the status defining means including programmable control means that is programmable by way of instructions downloaded from the external host controller through the data exchange bus, said downloaded instructions including instructions for causing the status defining means to test the integrity of the data exchange bus.

32. A redundant data storage system according to claim 31 wherein:

the status defining means is further operatively coupled to a selected one or more of the plural data storage means and the physical-support slots for sensing a local status of the selected one or more of the plural data storage means and the physical-support slots;

the status defining means is further for reporting the sensed local status to the data exchange bus in accordance with the said downloaded instructions; and said local status includes one or more parameters selected from the group consisting of:

(a) a local power current level inside a specified one of the selected plural data storage means;

(b) an amount of deviation from a prespecified nominal value for a local power current level inside a specified one of the selected plural data storage means;

(c) a temperature level inside a specified one of the selected plural data storage means;

(d) a temperature condition inside a specified one of the selected plural data storage means that is outside of a predefined range;

(e) a presence within a specified one of the selected plural physical-support slots of a corresponding data storage means;

(f) a local removability from a specified one of the selected plural physical-support slots of a corresponding data storage means; and (g) an abnormal sound emanating from one of the selected plural data storage means.

33. A status monitoring and reporting system for use in conjunction with a SCSI-based array of plural data storage units, the system comprising:

status defining means for monitoring two or more operational attributes of the plural data storage devices, at least two of the monitored attributes being selected from the group consisting of:

(a) a local voltage or current condition of each data storage device, (b) the amount of accumulated active usage time of each data storage device, (c) the amount of free storage space available in each data storage device, (d) the historical error rate of each data storage device, (e) the volume of data access requests made to each data storage device, (f) the air flowrate output of one or more cooling fans provided for cooling each data storage device, (g) the local temperature of each data storage device, and (h) the closed/open, locked/unlocked states of one or more access doors providing physical access to each data storage device; and the system further comprising:

SCSI interface means, coupled between the status defining means and the SCSI bus, for transferring status information from the status defining unit to the SCSI bus, the transferred status information indicating the state of a monitored one or more of said attributes.

34. A status control system for use in conjunction with an array of SCSI-based data storage units, the status control system comprising:

a status control unit for controlling two or more operational attributes of the array of data storage units, at least two of the controlled attributes being selected from the group consisting of:

(a) the voltage or current of one or more power supplies provided for supplying power to each data storage device, (b) the cooling rate of one or more temperature control units provided for regulating the temperature of each data storage device, (c) the locked/unlocked state of one or more lockable access doors providing physical access to each data storage device;

and the system further comprising:

SCSI interface means, coupled between the status control means and the SCSI bus, for receiving status control commands from the SCSI bus and transferring the control commands to the status control unit for execution, the transferred control commands indicating a desired state for a controllable one or more of said attributes.

35. A method of monitoring and controlling a cluster of data storage modules interconnected by a data exchange bus wherein operations of the cluster are supported by power maintenance and other maintenance subsystems, said method comprising the steps of:

(a) attaching a status defining means to the data exchange bus;

(b) operatively coupling the status defining means to the power maintenance and other environment maintenance subsystems of the cluster; and (c) operating the status defining means so that the status defining means provides one or more of the following functions:

(c.1) providing on-site reports via an on-site indicator means of cluster status and cluster problems to an on-site observer by way of a frontpanel messaging module;

(c.2) providing off-site reports via the data exchange bus of cluster status and cluster problems to a remote system supervisor;

(c.3) testing the data path integrity of the data exchange bus;

(c.4) storing retrievable data providing error history, repair history, and usage history information about a portable one or more of the cluster of data storage modules with which the status defining means is associated;

(c.5) supporting inventory/asset management functions in a large network containing the cluster of data storage modules;

(c.6) monitoring traffic patterns of communications to or from members of the cluster;

(c.7) switching a configuration of the cluster in response to a sensed degradation event within the cluster;

(c.8) monitoring and managing background environmental aspects of cluster operation such as maintaining appropriate temperatures within the cluster, maintaining predefined power levels within the cluster, and assuring physical security of cluster members.

36. The SCSI cluster of claim 1 wherein said at least one of the SCSI modules comprises at least three substantially similar SCSI modules.

37. The SCSI cluster of claim 36 wherein said at least three substantially similar SCSI modules define a RAID bank.

38. The SCSI cluster of claim 1 wherein said at least one of the SCSI modules comprises six substantially similar SCSI modules.

39. The SCSI cluster of claim 38 wherein said at least six substantially similar SCSI modules defines two RAID banks.

40. The SCSI cluster of claim 4 wherein said status monitoring and reporting means includes nonvolatile writable memory means for storing test instructions downloaded through said SCSI bus prior to said integrity testing of the SCSI bus.

41. A data storage and retrieval system comprising:

(a) a host computer including a host-to-SCSI adaptor module for coupling the host computer to a plurality of independent SCSI buses, each of the SCSI buses being capable of operatively coupling together a limited, respective number of SCSI modules at one time, the host-to-SCSI adaptor module defining a first such SCSI module on each of said plurality of independent SCSI buses;

(b) a plurality of storage array housing cabinets each operatively coupled to at least one bus of said plurality of independent SCSI buses, wherein:

(b.1) each storage array housing cabinet houses a respective plurality of data storage devices, (b.2) each storage array housing cabinet further houses a respective two or more modularly-replaceable redundant power supplies that are operatively coupled to supply operating power to the respective data storage devices of the cabinet, (b.3) each storage array housing cabinet further houses a respective two or more redundant cooling fans each fan being operatively coupled to provide mutually independent cooling to the redundant power supplies and to the data storage devices of the cabinet, (b.4) each storage array housing cabinet further includes:

status defining means also operatively coupled to the respective SCSI bus, the status defining means being further operatively coupled to a selected one or more of the plural SCSI modules for sensing a local status of the selected one or more of the SCSI modules, said local status being one that cannot be otherwise determined by way of the SCSI bus and the status defining means being further for reporting the sensed local status to the data exchange bus;

wherein said local status includes one or more parameters selected from the group consisting of:

(a) a local power voltage level inside a specified one of the selected plural SCSI modules;

(b) a local power current level inside a specified one of the selected plural SCSI modules;

(c) an amount of deviation from a prespecified nominal value for a local power voltage level inside a specified one of the selected plural SCSI modules;

(d) an amount of deviation from a prespecified nominal value for a local power current level inside a specified one of the selected plural SCSI modules;

(e) a temperature level inside a specified one of the selected plural SCSI modules; and (f) a temperature condition inside a specified one of the selected plural SCSI modules that is outside of a predefined range.

* * * * *

UNITED STATES PATENT AND TRADEMARK OFFICE
CERTIFICATE OF CORRECTION

PATENT NO. : 5,586,250
DATED : December 17, 1996
INVENTOR(S) : Guy A. Carbonneau et al.

It is certified that error appears in the above-indentified patent and that said Letters Patent is hereby corrected as shown below:

```
Column 5, line 29, "(SEt)" should be --(SMARt)--.
Column 24, line 19, "claim 1" should be --claim 18--; line 36,
          "claim 9" should be --claim 26--.
Column 25, line 60, before "current" insert --local--.
Column 27, line 12, "claim 1" should be --claim 18--; line 18,
          "claim 1" should be --claim 18--; line 24, "claim 4"
          should be --claim 21--.
```

Signed and Sealed this

Sixth Day of May, 1997

Attest:

BRUCE LEHMAN

Attesting Officer　　　　Commissioner of Patents and Trademarks